United States Patent
Jain et al.

(10) Patent No.: US 10,268,516 B2
(45) Date of Patent: Apr. 23, 2019

(54) MERGING CONNECTION POOLS TO FORM A LOGICAL POOL OF CONNECTIONS DURING A PRESET PERIOD OF TIME THEREBY MORE EFFICIENTLY UTILIZING CONNECTIONS IN CONNECTION POOLS

(71) Applicant: International Business Machines Corporation, Armonk, NY (US)

(72) Inventors: Rispna Jain, Bentonville, AR (US); Anoop Gowda Malaly Ramachandra, Mysore (IN)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 15/292,828

(22) Filed: Oct. 13, 2016

(65) Prior Publication Data
US 2017/0031716 A1 Feb. 2, 2017

Related U.S. Application Data

(62) Division of application No. 14/502,226, filed on Sep. 30, 2014, now Pat. No. 9,563,475.

(51) Int. Cl.
*G06F 9/455* (2018.01)
*G06F 9/50* (2006.01)
*H04L 29/06* (2006.01)

(52) U.S. Cl.
CPC ........ *G06F 9/5011* (2013.01); *G06F 9/45558* (2013.01); *H04L 65/1063* (2013.01); *G06F 2009/45595* (2013.01)

(58) Field of Classification Search
CPC ............... G06F 11/328; G06F 11/3447; G06F 11/3495; G06F 17/5045; G06F 9/5011;
(Continued)

(56) References Cited

U.S. PATENT DOCUMENTS 8,286,174 B1 10/2012 Schmidt et al.
8,423,998 B2 4/2013 Isci et al.
(Continued)

OTHER PUBLICATIONS

Clayman et al., INOX: a managed service platform for interconnected smart objects, 8 paged (Year: 2011).*
(Continued)

*Primary Examiner* — Thuy Dao
(74) *Attorney, Agent, or Firm* — Robert A. Voigt, Jr.; Winstead, P.C.

(57) ABSTRACT

A method, system and computer program product for efficiently utilizing connections in connection pools. A period of time an application running on a virtual machine needs a greater number of connections to an external resource than allocated in its pool of connections is identified. The connection pool for this application as well as the connection pools for the other applications containing connections to the same external resource are merged to form a logical pool of connections to be shared by those applications during the identified period of time. Alternatively, in an application server cluster environment, the connection pools utilized by the application servers to access the external resource may be reconfigured based on the weight assigned to each member (or application server) of the cluster which is based on the member's load size. In these manners, the resource connections in these pools of connections will be more efficiently utilized.

3 Claims, 4 Drawing Sheets

(58) Field of Classification Search
CPC ............ G06F 9/45558; G06F 9/45595; G06F 2009/45595; G06F 4165/1063; H04L 29/06; H04L 29/12009; H04L 69/16
See application file for complete search history.

(56) References Cited

U.S. PATENT DOCUMENTS

| | | | |
|---|---|---|---|
| 8,429,652 | B2 | 4/2013 | Muthiah et al. |
| 9,407,692 | B2* | 8/2016 | Rajagopalan ....... H04L 67/1014 |
| 9,558,039 | B2* | 1/2017 | Bryant ................. G06F 9/5011 |
| 9,692,820 | B2* | 6/2017 | Chaudhary ........... G06F 9/5011 |
| 9,870,244 | B2* | 1/2018 | Cao ..................... G06F 9/45558 |
| 2005/0188088 | A1 | 8/2005 | Fellenstein et al. |
| 2005/0268276 | A1 | 12/2005 | Tankov et al. |
| 2005/0278439 | A1* | 12/2005 | Cherkasova ............ H04L 67/06 709/223 |
| 2006/0031388 | A1 | 2/2006 | Tankov et al. |
| 2006/0209718 | A1 | 9/2006 | Kinsey et al. |
| 2010/0333111 | A1 | 12/2010 | Kothamasu et al. |
| 2011/0149737 | A1 | 6/2011 | Muthiah et al. |
| 2011/0178790 | A1 | 7/2011 | Golboum et al. |
| 2011/0202925 | A1 | 8/2011 | Banerjee et al. |
| 2012/0226788 | A1 | 9/2012 | Jackson |
| 2012/0284712 | A1 | 11/2012 | Nimmagadda et al. |
| 2013/0290957 | A1* | 10/2013 | Li ........................ G06F 9/5066 718/1 |
| 2014/0173113 | A1 | 6/2014 | Vemuri et al. |
| 2014/0173595 | A1 | 6/2014 | Anand et al. |
| 2014/0222889 | A1 | 8/2014 | Bello et al. |
| 2015/0040128 | A1 | 2/2015 | Garza et al. |
| 2015/0244643 | A1 | 8/2015 | Kinoshita et al. |
| 2015/0263982 | A1 | 9/2015 | Fall et al. |
| 2015/0331707 | A1 | 11/2015 | Hellkvist et al. |
| 2016/0004551 | A1 | 1/2016 | Terayama et al. |
| 2016/0092277 | A1 | 3/2016 | Crowell et al. |

OTHER PUBLICATIONS

A. Makela, Concept for providing guaranteed service level over an array of unguaranteed commodity connections, 6 pages (Year: 2010).*

Meng et al., "Efficient Resource Provisioning in Compute Clouds via VM Multiplexing," Proceeding ICAC'10 Proceedings of the 7th International Conference on Autonomic Computing, Jun. 7-11, 2010, pp. 11-20, ISBN: 978-1-4503-00742.

Mick Jordan, "Policy-Based Management of a JDBC Connection Pool," Feb. 2006, pp. 1-21.

Xiaoli et al., "XML-Based Heterogeneous Database Integration System Design and Implementation," 3rd IEEE International Conference on Computer Science and Information Technology, Chengdu, 2010, pp. 547-550.

Paturde et al., "Integration of Heterogeneous Databases and Creating Materialized View," International Journal of Advanced Electronics & Communication Systems, vol. 3, Issue 3, 2014, pp. 1-4.

Soror et al., "Automatic Virtual Machine Configuration for Database Workloads," ACM Transactions on Database Systems, vol. 35, No. 1, Article 7, Feb. 2010, pp. 1-47.

List of IBM Patents or Patent Applications Treated as Related, dated Oct. 13, 2016, pp. 1-2.

* cited by examiner

MERGING CONNECTION POOLS TO FORM A LOGICAL POOL OF CONNECTIONS DURING A PRESET PERIOD OF TIME THEREBY MORE EFFICIENTLY UTILIZING CONNECTIONS IN CONNECTION POOLS

TECHNICAL FIELD

The present invention relates generally to connection pools utilized in the Java EE Connector Architecture (JCA), and more particularly to merging connection pools to form a logical pool of connections during a preset period of time thereby more efficiently utilizing connections in connection pools.

BACKGROUND

The Java 2 Platform, Enterprise Edition (J2EE) is a software standard for developing multitier enterprise applications. The J2EE architecture has a client tier, middle tier, and back-end tier. The client tier supports a variety of client types, and the middle tier supports client services and business logic through web and Enterprise Java Beans (EJB) containers in the middle tier. The back-end tier includes the Enterprise Information Systems (EIS) in the EIS tier and many standard Application Programming Interfaces (APIs) for accessing databases. An Enterprise Information System is generally any kind of computing system that offers high quality of service, deals with large volumes of data and capable of supporting some large organization ("an enterprise"). One of skill in the art can accordingly alter the objects and components resident on the several tiers. "Containers" are standardized runtime environments that provide services to components on the platform. All containers provide runtime support for responding to client requests and returning results to clients. The containers also provide APIs to support user session management.

Resident within the J2EE architecture is a "resource adapter" that plays a central role in the integration and connectivity between an EIS and an application server (software framework dedicated to the efficient execution of procedures for supporting the construction of applications) and serves as the point of contact between application components, application servers and enterprise information systems. A resource adapter and other components, must communicate with one another based on a standard referred to as the J2EE Connector Architecture (JCA). To enable seamless integration with an application server, the resource adapter abides by system-level "contracts" defined by the JCA. These contracts exist between the application server and the EIS, and are implemented through the resource adapter. The contracts specify how a system external to the J2EE platform integrates with it by supporting basic functions handled by the J2EE container. There are three major contracts: the "connection management contract" which allows applications to connect to an EIS, and enables the application server to utilize pooling (pooling of resource connections); the "transaction management contract" which allows an application server to manage and perform transactional access across one to many EIS resource managers; and the "security contract" which provides support for secure access to the EIS.

As discussed above, the connection management contract allows the application server to pool resource connections. In connection with pooling resource connections, an object, commonly referred to as a connection factory, creates the resource connections to a resource (e.g., database) based on the properties configured on the connection factory instance.

Applications running by an EIS system (e.g., tax collection application, online banking application) may service different number of requests during different times of the day and therefore need a different number of resource connections to a database (resource) to store or retrieve data in connection with servicing these requests. For example, suppose a tax collection application is used to collect tax information from individuals and corporations on behalf of the government. The tax collection application is busy at the end of the work day between 4:00 pm-6:00 pm and also at the end of the month (e.g., $29^{th}$, $30^{th}$ and $31^{st}$ day) as tax submissions peak at this time. At peak time, this application requires more than 100 connections to the database (resource) to be available for the requests to be serviced. Normally, during non-peak times, the application needs an average of 30-40 connections to the database. Hence, in order to ensure that there are enough connections to the database (resource) during any particular time, the administrator configures the connection factory to create a maximum pool size of 100 connections. In case there are more than 100 concurrent users accessing the tax collection application, they would have to wait for free connections to become available.

Furthermore, suppose a second application, an online banking application, uses a separate connection pool to access the same database (resource). The online banking application is busy from 9:00 am-4:00 pm on Monday through Friday, and especially busy during 9:00 am-1:00 pm (peak-time), where 250 connections to the database are required to service the requests. However, if the database can only handle 300 connections concurrently, then the administrator configures the connection factory to create a maximum pool size of 200 connections for this application. Hence, during the peak-time, the online banking application would not be able to service all the requests concurrently.

However, during 9:00 am-4:00 pm on Monday through Friday (except the last few days of the month), the tax collection application only needs an average of 30-40 connections to the database. Hence, it has about 60-70 connections unused during that time since it is allocated 100 connections to the database to service requests. As a result, the resource connections are not being optimally utilized. The online banking application users will have to wait until the connections are released in order to be served despite the fact that tax collection application has about 60-70 connections unused during the time that the online banking application could use additional connections.

While an administrator may attempt to manually reconfigure the size of the connection pool for the applications, such as reducing the size of the connection pool for the tax collection application and increasing the size of the connection pool for the online banking application, applications may unpredictably receive an increase in the number of requests to be serviced, including for the application whose pool of connections was reduced, and therefore, may no longer be able to service all the requests concurrently.

Hence, there is not currently a means for efficiently utilizing the resource connections in the connection pools.

BRIEF SUMMARY

In one embodiment of the present invention, a method for efficiently utilizing connections in connection pools comprises identifying a period of time a first application running on a first virtual machine needs a greater number of resource connections to a resource than allocated in its first pool of connections of a first fixed size. The method further comprises merging, by a processor, the first pool of connections with a second pool of connections of a second fixed size utilized by a second application of a second virtual machine to access the resource to form a logical pool of connections to be shared by the first and second applications of the first virtual machine and the second virtual machine, respectively, during the period of time, where the first and second pools of connections contain resource connections to the resource.

Other forms of the embodiment of the method described above are in a system and in a computer program product.

In another embodiment of the present invention, a method for efficiently utilizing connections in connection pools comprises assigning a weight to each member of a cluster of members based on a size of a load serviced by each cluster member. The method further comprises computing a maximum connection pool size for each member of the cluster of members based on the weight assigned to each member of the cluster of members and a total number of connections allocated to a resource. Furthermore, the method comprises configuring, by a processor, a connection pool size for each member of the cluster of members to correspond with its corresponding computed maximum connection pool size.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for efficiently utilizing connections in connection pools. In one embodiment of the present invention, a period of time an application running on a virtual machine needs a greater number of resource connections to an external resource (e.g., database) than allocated in its pool of connections is identified. The connection pool for this application as well as the connection pools for the other applications containing the resource connections to the same external resource are merged to form a logical pool of connections to be shared by those applications of the virtual machines during the identified period of time. In this manner, when an application needs more connections at its peak load than the number of connections allocated in its pool of connections, then those connections that are not being utilized in the connection pools by the other applications can be utilized by the application. As a result, the resource connections are being more efficiently utilized in the connection pools. Alternatively, in an application server cluster environment, the connection pools utilized by the application servers to access the external resource may be reconfigured based on the weight assigned to each member (or application server) of the cluster which is based on the load size serviced by the member. In this manner, the resource connections in these pools of connections will be more efficiently utilized.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
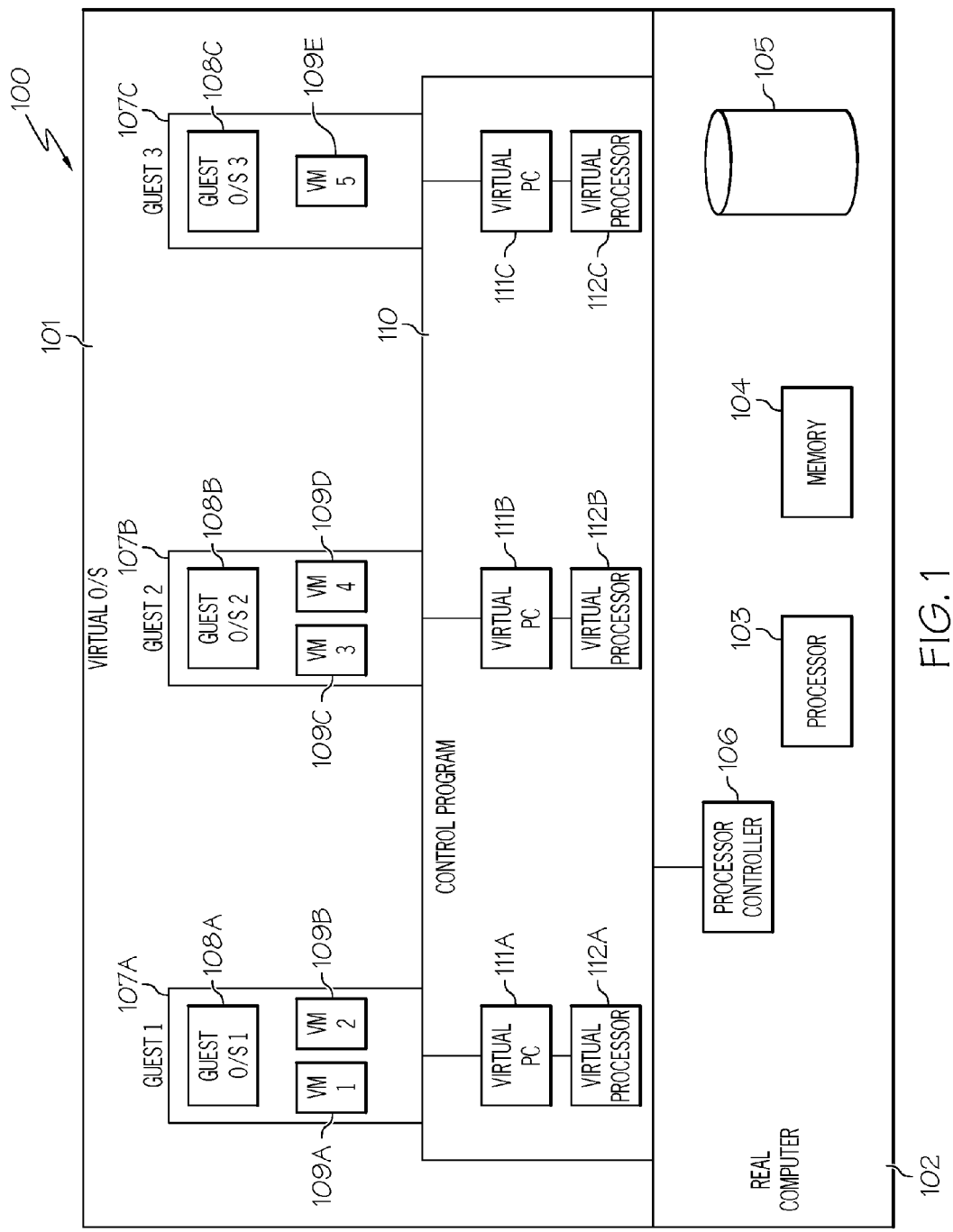
FIG. 1 illustrates a virtualization environment for a conventional server system in accordance with an embodiment of the present invention.

Referring now to the Figures in detail, FIG. 1 illustrates a virtualization environment for a conventional server system 100 in accordance with an embodiment of the present invention. Server 100 includes a virtual operating system 101, which can be an IBM™ z/VM operating system. Operating system 101 executes on a real or physical computer 102. Real computer 102 includes one or more processors 103, a memory 104 (also referred to herein as the host physical memory), one or more disk drives 105 and the like. Real computer 102 further includes a processor controller 106 that provides communication between virtual operating system 101 and physical computer 102. Other components of real computer 102 are not discussed herein for the sake of brevity.

Referring again to FIG. 1, virtual operating system 101 includes user portions 107A-107C (identified as "Guest 1," "Guest 2," and "Guest 3," respectively in FIG. 1), referred to herein as "guests." Guests 107A-107C may collectively or individually be referred to as guests 107 or guest 107, respectively. Each guest 107 is capable of functioning as a separate system. That is, each guest 107A-107C can be independently reset, host a guest operating system 108A-108C (identified as "Guest O/S 1," "Guest O/S 2," and "Guest O/S 3," respectively in FIG. 1), respectively, and operate with different programs. An operating system or application program running in guest 107 appears to have access to a full and complete system, but in reality, only a portion of it is available. Guest operating systems 108A-108C may collectively or individually be referred to as guest operating systems 108 or guest operating system 108, respectively.

Each guest operating system 108 may host one or more virtual machine applications 109A-109E (identified as "VM 1," "VM2," "VM3," "VM4," and "VM5," respectively in FIG. 1), such as Java™ virtual machines. For example, guest operating system 108A hosts virtual machine applications 109A-109B. Guest operating system 108B hosts virtual machine applications 109C-109D and guest operating system 108C hosts virtual machine application 109E. Virtual machine applications 109A-109E may collectively or individually be referred to as virtual machine applications 109 or virtual machine application 109, respectively.

FIG. 1 is not to be limited in scope to a particular number of guests 107 executing a particular number of guest operating systems 108 hosting a particular number of virtual machine applications 109.

Virtual operating system 101 further includes a common base portion 110 referred to as a hypervisor or as a control program. Hypervisor or control program 110 may be implemented in microcode running on processor 103 or it may be implemented in software as part of virtual operating system 101. Control program 110 is configured to manage and enable guests 107 to run on a single host. Control program 110 includes a virtual processor controller 111A-111C associated with each guest 107A-107C, respectively. Virtual processor controllers 111A-111C may collectively or individually be referred to as virtual processor controllers 111 or virtual processor controller 111, respectively. Virtual processor controller 111 provides communication between guest operating system 108 and control program 110.

Control program 110 further implements virtual processors 112A-112C, one for each virtual processor controller 111A-111C, respectively. That is, control program 110 implements virtual processors 112A-112C, one for each guest 107A-107C, respectively. Virtual processors 112A-112C may collectively or individually be referred to as virtual processors 112 or virtual processor 112, respectively.

As discussed above, virtual operating system 101 and its components execute on physical or real computer 102. These software components may be loaded into memory 104 for execution by processor 103. Furthermore, an application for efficiently utilizing connections in connection pools, as discussed below in connection with FIGS. 2-5, may be loaded into memory 104 for execution by processor 103.

Server 100 may include applications running on virtual machines 109, including an application server that includes applications. Server 100 may provide interfaces to certain external resources, such as a database. In one embodiment, server 100 includes a J2EE compatible system. In operation of server 100, connections may be required between the applications running on virtual machines 109 and the external resources. To produce such connections, an entity may make a request to generate an instance of a connection factory, the connection factory being a program object to generate a pool of connections between the application and the external resource. The principles of the present invention ensure that there are enough connections available to the external resource by the application during a particular time, such as during the peak-load time of the application, as discussed further below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, in order to ensure that there are enough connections to the database (external resource) by the application during any particular time, including the peak-load time of the application, the administrator configures the connection factory to create a maximum connection pool size for each application. However, in certain situations, there may be connections in the connection pool to the resource unused by the application during its non-peak times; whereas, other applications may have an insufficient number of connections to the resource during its peak-times, which may correspond to the non-peak times of the application with excess resource connections. As a result, the resource connections are not being optimally utilized. While an administrator may attempt to manually reconfigure the size of the connection pool for the applications, applications may unpredictably receive an increase in the number of requests to be serviced, including for the application whose pool of connections was reduced, and therefore, may no longer be able to service all the requests concurrently. Hence, there is not currently a means for efficiently utilizing the resource connections in the connection pools.

Figure 2:
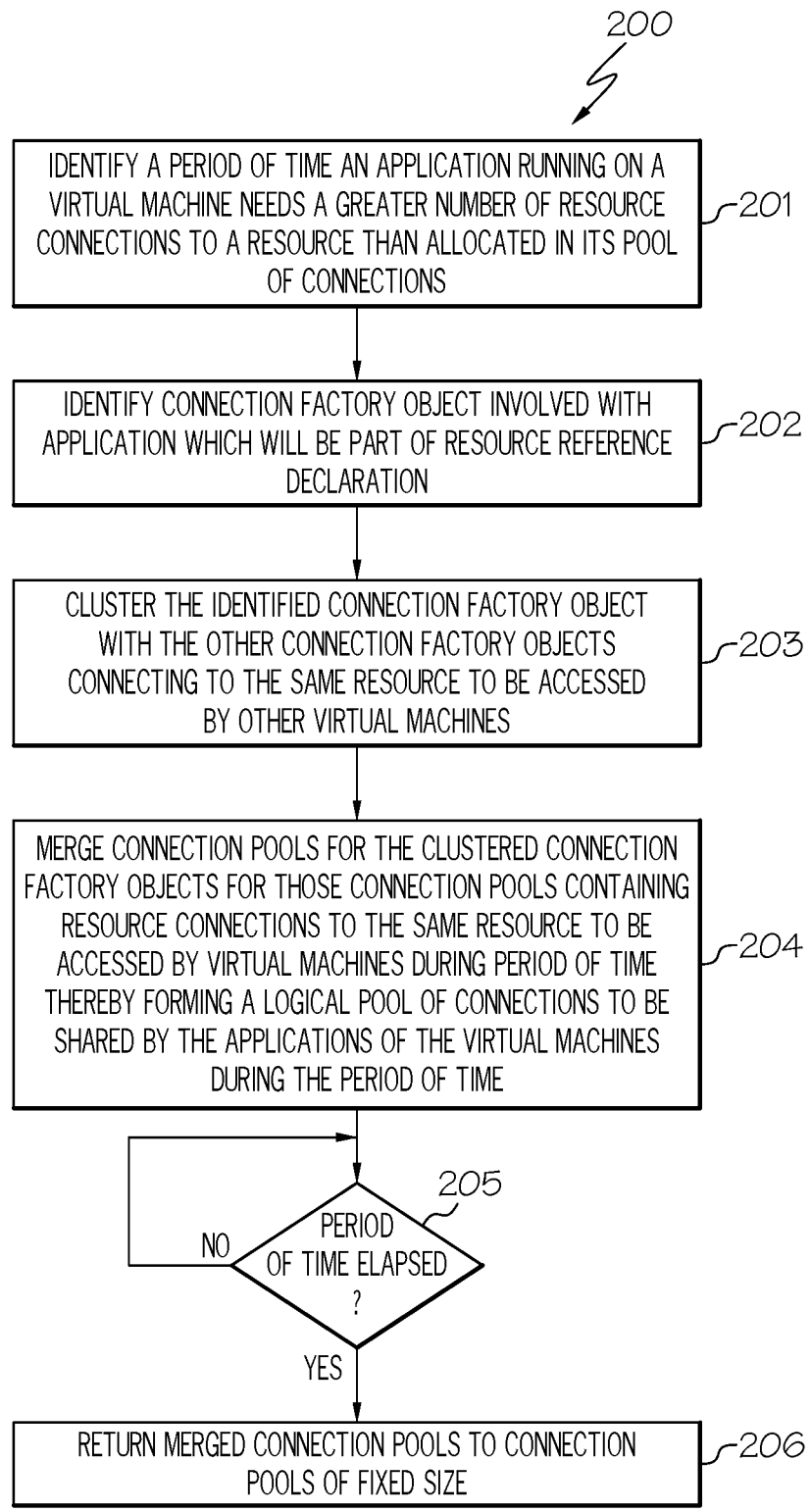
FIG. 2 is a flowchart of a method for merging pools of connections to form a logical pool of connections in accordance with an embodiment of the present invention.
Figure 3:
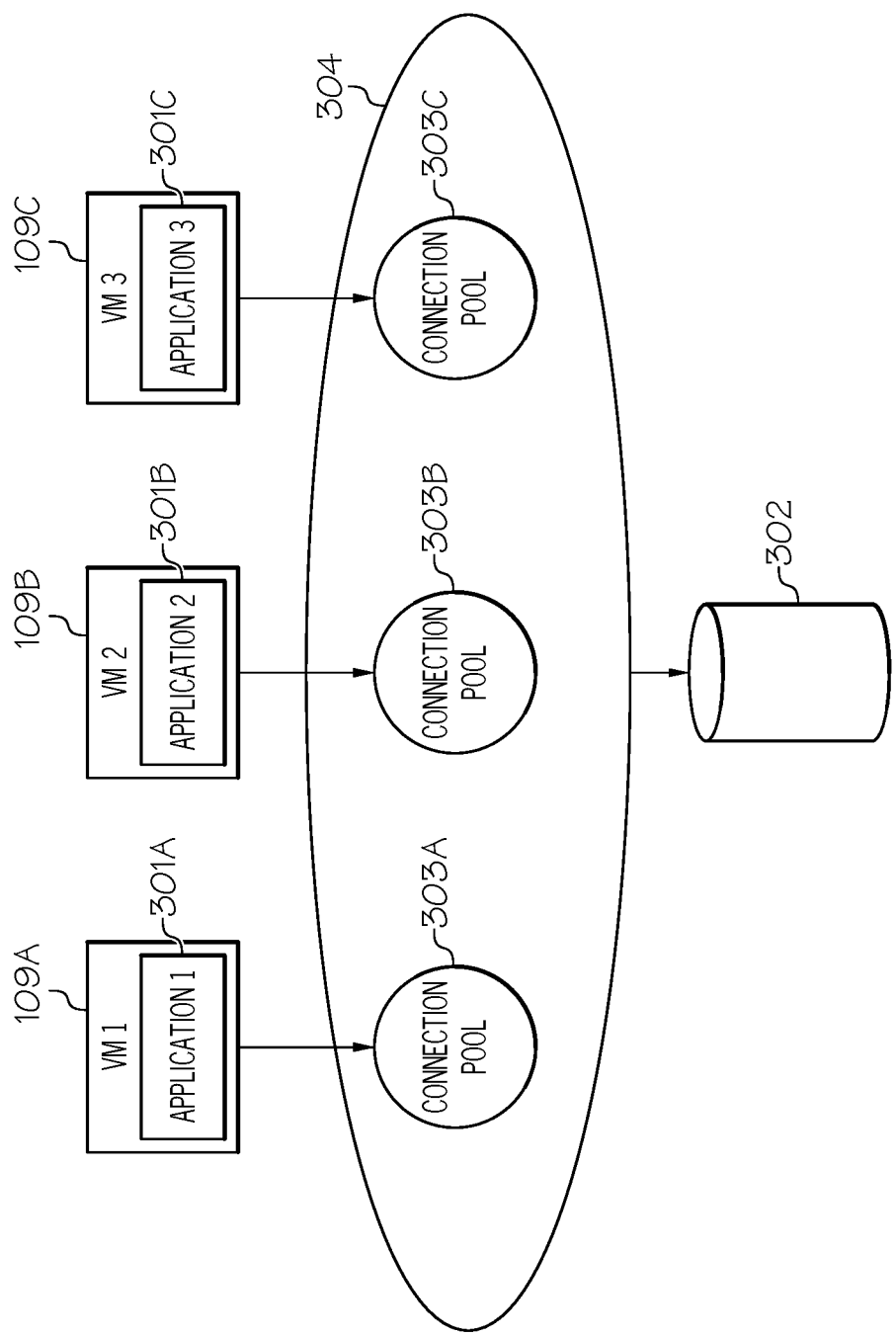
FIG. 3 illustrates merging pools of connections utilized by the applications running on the virtual machines to form a logical pool of connections in accordance with an embodiment of the present invention.
Figure 4:
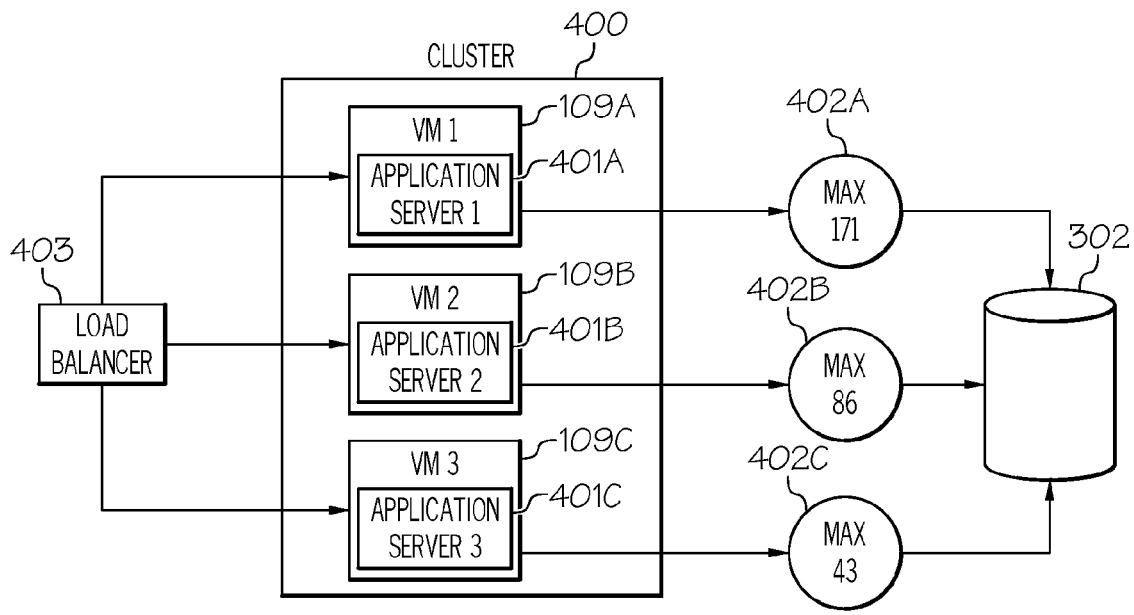
FIG. 4 illustrates configuring connection pool sizes for members of a cluster in an application server cluster environment in accordance with an embodiment of the present invention.
Figure 5:
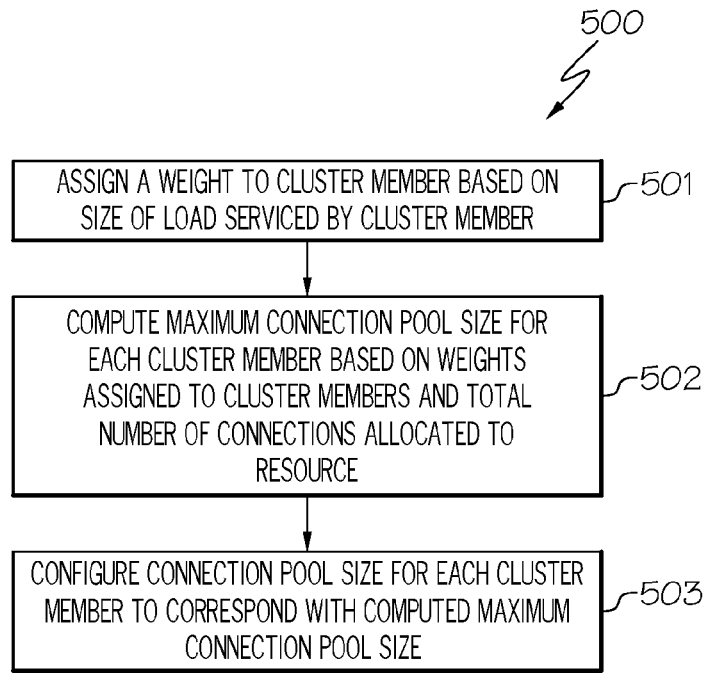
FIG. 5 is a flowchart of a method for configuring connection pool sizes for members of a cluster in an application server cluster environment in accordance with an embodiment of the present invention.

The principles of the present invention provide a means for more efficiently utilizing the resource connections in the connection pools by merging the pools of connections utilized by the applications running on virtual machines 109 (FIG. 1) containing connections to the same resource to form a logical pool of connections to be shared by the applications during a period of time, which may be based on business requirements as discussed below in association with FIGS. 2-5. FIG. 2 is a flowchart of a method for merging pools of connections to form a logical pool of connections. FIG. 3 illustrates merging pools of connections utilized by the applications running on the virtual machines to form a logical pool of connections. FIG. 4 illustrates configuring connection pool sizes for members of a cluster in an application server cluster environment. FIG. 5 is a flowchart of a method for configuring connection pool sizes for members of a cluster in an application server cluster environment.

As stated above, FIG. 2 is a flowchart of a method 200 for merging pools of connections to form a logical pool of connections in accordance with an embodiment of the present invention.

Referring to FIG. 2, in conjunction with FIG. 1, in step 201, server 100 identifies a period of time an application running on a virtual machine 109 needs a greater number of resource connections to an external resource (e.g., database) than allocated in its pool of connections. For example, suppose that an online banking application running on virtual machine 109 needs 250 connections to the external resource (e.g., database) from 9:00 am-1:00 pm (peak-time) on Monday-Friday. However, the maximum connection pool size for the online banking application is limited to 200 connections. Hence, based on the business requirements for this application, there is a need for a greater number of resource connections to the external resource during that period of time. The period of time, as used herein, may be based on the day, week, month, morning, evening and/or specific hours.

In step 202, server 100 identifies the connection factory object involved with the application (application discussed in step 201) which will be part of the resource reference declaration. As discussed above, the connection factory object creates the resource connections to the external resource, such as a database, based on the properties configured on the connection factory instance. Each application may be associated with a connection factory object, which is used to create a pool of connections to the external resource. In one embodiment, the resource is referenced by a resource reference declaration which will include the connection factory that is used to create the pool of connections utilized by the application discussed in step 201 to connect to the external resource.

In step 203, server 100 clusters the identified connection factory object of step 202 with the other connection factory objects connecting to the same external resource to be accessed by the other virtual machines 109. By clustering the connection factory objects connecting to the same external resource, the connection pools created by these connection factory objects will be able to be merged as discussed below.

In step 204, server 100 merges the connection pools for the cluster connection factory objects for those connection pools containing the resource connections to the same external resource to be accessed by virtual machines 109 during the period of time identified in step 201 thereby forming a logical pool of connections to be shared by the applications of virtual machines 109 during the period of time as illustrated in FIG. 3.

FIG. 3 illustrates merging pools of connections utilized by the applications running on virtual machines 109 to form a logical pool of connections in accordance with an embodiment of the present invention.

Referring to FIG. 3, in conjunction with FIGS. 1-2, applications of virtual machines 109, such as application 301A (identified as "Application 1" in FIG. 3) of virtual machine 109A, application 301B (identified as "Application 2" in FIG. 3) of virtual machine 109B and application 301C (identified as "Application 3" in FIG. 3) of virtual machine 109C, are connected to an external resource 302, such as a database, via connection pools 303A-303C, respectively, established by connection factory objects. Applications 301A-301C may collectively or individually be referred to as applications 301 or application 301, respectively. Connection pools 303A-303C may collectively or individually be referred to as connection pools 303 or connection pool 303, respectively. FIG. 3 is not to be limited in scope to the depicted number of applications 301, virtual machines 109 and connection pools 303. The principles of the present invention may be used to merge any number of connection pools 303 into a logical pool of connections, as discussed below, to be shared by any number of applications 301 running on any number of virtual machines 109.

During a period of time, such as when application 301A needs a greater number of resource connections to external resource 302 than allocated in its pool of connections, each of these connection pools 303A-303C are merged to form a logical pool of connections 304 to be shared by applications 301A-301C for a period of time determined in step 201. In this manner, when an application 301, such as application 301A, needs more connections at its peak load than the number of connections allocated in its pool of connections 303, then those connections that are not being utilized in the other connection pool(s) 303 by the other applications 301, such as application 301B, can be utilized by application 301A. As a result, the resource connections are being more efficiently utilized in connection pools 303. After the period of time (identified in step 201) elapses, those connections that were utilized by application 301 that came from a different connection pool 303 than its own connection pool 303 would be returned to its original connection pool 303.

Returning to FIG. 2, in conjunction with FIGS. 1 and 3, in step 205, a determination is made by server 100 as to whether the period of time identified in step 201 elapsed. If the period of time identified in step 201 did not elapse, then server 100 continues to determine whether the period of time identified in step 201 elapsed in step 205.

If, however, the period of time identified in step 201 elapsed, then, in step 206, server 100 returns the merged connection pools 303 to the connection pools 303 of fixed size. For example, referring to FIG. 3, if connection pool 303A had a fixed size of 200 resource connection, connection pool 303 B had a fixed size of 50 resource connections and connection pool 303C had a fixed size of 50 resource connections, then after merging connection pools 303A-303C, a logical pool of connections 304 of 300 resource connection to be shared among applications 301 would be formed for the period of time identified in step 201. After the period of time elapses, then the merged connection pools 303 (i.e., the logical pool of connections 304) would be returned to connection pools 303A-303C of fixed size of 200, 50 and 50 resource connections, respectively.

As discussed above, server 100 may include applications running on virtual machines 109, including an application server that includes applications. In an application server cluster environment, where each application server runs on a virtual machine 109 that corresponds to a node of the cluster, an application server may need a greater number of resource connections to the external resource than allocated in its pool of connections in a similar manner as discussed above. To address such a need, the connection pools utilized by the application servers to access the external resource may be reconfigured based on the weight assigned to each member (or application server) of the cluster which is based on the load size serviced by the member as discussed further below in connection with FIGS. 4-5.

FIG. 4 illustrates members (e.g., application servers) of a cluster 400 in an application server cluster environment whose connection pool sizes will be reconfigured in accordance with an embodiment of the present invention.

Referring to FIG. 4, application servers 401A-401C (identified as "application server 1," "application server 2," and "application server 3," respectively in FIG. 4) running on virtual machines 109A-109C, respectively, in cluster 400 are connected to an external resource 302, such as a database, via connection pools 402A-402C, respectively, established by connection factory objects. Application servers 401A-401C may collectively or individually be referred to as application servers 401 or application server 401, respectively. Connection pools 402A-402C may collectively or individually be referred to as connection pools 402 or connection pool 402, respectively. In one embodiment, each virtual machine 109 (e.g., virtual machines 109A-109C) is located on a node of cluster 400.

As further illustrated in FIG. 4, a software component, referred to as a "load balancer" 403, which may be loaded into memory 104 for execution by processor 103, is configured to reconfigure the number of resource connections in connections pools 402 based on the weight assigned to each member (or application server) of cluster 400 as discussed further below in connection with FIG. 5. FIG. 4 is not to be limited in scope to the depicted number of application servers 401, virtual machines 109 and connection pools 402.

FIG. 5 is a flowchart of a method 500 for configuring connection pool sizes for members of a cluster in an application server cluster environment in accordance with an embodiment of the present invention.

Referring to FIG. 5, in conjunction with FIGS. 1 and 4, in step 501, load balancer 403 assigns a weight to a cluster member based on the size of the load serviced by the cluster member (e.g., application server 401). For example, load balancer 403 may assign a weight of 20 to application server 401A, assign a weight of 10 to application server 401B and assign a weight of 5 to application server 401C based on the size of the load serviced by these application servers 401. For instance, application server 401B may be assigned a weight of twice the weight of application server 401C since the size of its load is twice the size of the load serviced by application server 401C. Similarly, application server 401A may be assigned a weight of twice the weight of application server 401B since the size of its load is twice the size of the load serviced by application server 401B.

In step 402, load balancer 403 computes the maximum connection pool size (i.e., the number of connections available in connection pool 402) for each cluster member (e.g., application server 401) based on the weights assigned to the cluster members and the total number of connections allocated to external resource 302. In one embodiment, the maximum connection pool size for each cluster member equals:

$$MaxConectionPoolSize_{cm} = (W_{cm}/(TW_{cms}))*MaxTotalSize \quad (EQ\ 1)$$

where the parameter "MaxConectionPoolSizecm" corresponds to the maximum connection pool size for a cluster member (e.g., application server 401A), the parameter "Wcm" corresponds to the weight assigned to the cluster member (e.g., weight of 20 assigned to application server 401A), the parameter "TWcms" corresponds to the total weight assigned to all the cluster members (e.g., weights of 20 plus 10 plus 5) and the parameter of MaxTotalSize corresponds to the total number of resource connections (e.g., 300 connections) allocated to this external resource (e.g., database 302).

For example, suppose that application server 401A is assigned a weight of 20, application server 401B is assigned a weight of 10 and application server 401C is assigned a weight of 5. Suppose further that the total number of resource connections allocated to database 302 is 300. Hence, the maximum connection pool size for application server 401A (i.e., the maximum number of resource connections in connection pool 402A) corresponds to 171 ((20/35)*300) connections using EQ 1 as illustrated in FIG. 4. The maximum connection pool size for application server 401B (i.e., the maximum number of resource connections in connection pool 402B) corresponds to 86 ((10/35)*300) connections using EQ 1 as illustrated in FIG. 4. Furthermore, the maximum connection pool size for application server 401C (i.e., the maximum number of resource connections in connection pool 402C) corresponds to 43 ((5/35)*300) connections using EQ 1 as illustrated in FIG. 4.

In step 503, load balancer 403 configures the connection pool size (i.e., the number of connections available in connection pool 402) for each cluster member (e.g., application server 401) to correspond with the maximum connection pool size computed in step 502.

Method 500 may be reiterated in response to any changes in the weight assigned to an application server 401 which occurs based on changes in the size of the load handled by application server 401.

By load balancer 403 reconfiguring the sizes of the pools of connections 402 for application servers 401 in cluster 400 based on the size of the loads serviced by application servers 401, the resource connections in these pools of connections 402 will be more efficiently utilized.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for efficiently utilizing connections in connection pools, the method comprising:
    assigning a weight to each member of a cluster of members based on a size of a load serviced by each cluster member, wherein each member of said cluster of members corresponds to an application server running on a virtual machine, wherein said virtual machine is located on a node of said cluster of members;
    computing a maximum connection pool size for each member of said cluster of members based on said weight assigned to each member of said cluster of members and a total number of connections allocated to a resource; and
    configuring, by a processor, a connection pool size for each member of said cluster of members to correspond with its corresponding computed maximum connection pool size.

2. A computer program product for efficiently utilizing connections in connection pools, the computer program product comprising a computer readable storage medium having program code embodied therewith, the program code comprising the programming instructions for:
    assigning a weight to each member of a cluster of members based on a size of a load serviced by each cluster member, wherein each member of said cluster of members corresponds to an application server running on a virtual machine, wherein said virtual machine is located on a node of said cluster of members;
    computing a maximum connection pool size for each member of said cluster of members based on said weight assigned to each member of said cluster of members and a total number of connections allocated to a resource; and
    configuring a connection pool size for each member of said cluster of members to correspond with its corresponding computed maximum connection pool size.

3. A system, comprising:
    a memory unit for storing a computer program for efficiently utilizing connections in connection pools; and
    a processor coupled to the memory unit, wherein the processor is configured to execute the program instructions of the computer program comprising:
        assigning a weight to each member of a cluster of members based on a size of a load serviced by each cluster member, wherein each member of said cluster of members corresponds to an application server running on a virtual machine, wherein said virtual machine is located on a node of said cluster of members;
        computing a maximum connection pool size for each member of said cluster of members based on said weight assigned to each member of said cluster of members and a total number of connections allocated to a resource; and
        configuring a connection pool size for each member of said cluster of members to correspond with its corresponding computed maximum connection pool size.

* * * * *